(12) United States Patent
Naoi

(10) Patent No.: US 11,338,487 B2
(45) Date of Patent: May 24, 2022

(54) SLIDE PIECE DRIVING MECHANISM

(71) Applicant: ENPLAS CORPORATION, Saitama (JP)

(72) Inventor: Hideaki Naoi, Saitama (JP)

(73) Assignee: ENPLAS CORPORATION, Saitama (JP)

( * ) Notice: Subject to any disclaimer, the term of this patent is extended or adjusted under 35 U.S.C. 154(b) by 717 days.

(21) Appl. No.: 16/096,373

(22) PCT Filed: Apr. 18, 2017

(86) PCT No.: PCT/JP2017/015605
§ 371 (c)(1),
(2) Date: Oct. 25, 2018

(87) PCT Pub. No.: WO2017/188067
PCT Pub. Date: Nov. 2, 2017

(65) Prior Publication Data
US 2020/0324449 A1    Oct. 15, 2020

(30) Foreign Application Priority Data

Apr. 28, 2016   (JP) .............................. JP2016-090142

(51) Int. Cl.
*B29C 45/44*     (2006.01)
*B29C 45/36*     (2006.01)

(52) U.S. Cl.
CPC .......... *B29C 45/36* (2013.01); *B29C 45/4421* (2013.01); *B29C 2045/363* (2013.01)

(58) Field of Classification Search
None
See application file for complete search history.

(56) References Cited

U.S. PATENT DOCUMENTS 4,515,342 A * 5/1985 Boskovic .............. B29C 45/332
                                                      249/122
7,963,759 B1 * 6/2011 Morey .................... B29C 45/66
                                                      425/451.9

FOREIGN PATENT DOCUMENTS

| JP | 7-116808   | 5/1995 |
| JP | 9-94862    | 4/1997 |
| JP | 2002-187170 | 7/2002 |
| JP | 2005-178358 | 7/2005 |

OTHER PUBLICATIONS

International Search Report dated Jun. 27, 2017 in International (PCT) Application No. PCT/JP2017/015605.

* cited by examiner

*Primary Examiner* — Armand Melendez
(74) *Attorney, Agent, or Firm* — Wenderoth, Lind & Ponack, L.L.P.

(57) ABSTRACT

A slide piece driving mechanism includes a side surface guiding portion, a shaft portion, and stopper releasing element. The side surface guiding portion is disposed at a movable side mold to guide a side surface of a slide piece to be slidably movable. The shaft portion of a stopper is disposed at the side surface guiding portion. When the slide piece reaches an upper end position, the shaft portion engages with a stopper hole of the slide piece to prevent the slide piece from falling from the upper end position due to own weight. The stopper releasing element releases the engagement of the shaft portion of the stopper with the stopper hole to allow the slide piece from falling from the upper end position due to its own weight.

9 Claims, 12 Drawing Sheets

SLIDE PIECE DRIVING MECHANISM

TECHNICAL FIELD

This invention relates to a slide piece driving mechanism that slides a slide piece in an up-down direction among slide pieces constituting a mold.

BACKGROUND ART

Conventionally, an injection molding mold for a molded product including an undercut portion (molded product where demolding is difficult) is processed as follows. A part from which the undercut portion is molded is divided into a plurality of slide pieces. When a molded product after injection molding is demolded, the slide pieces are each slidably moved to be separated from the molded product.

FIG. 11 is a cross-sectional view of a conventional injection molding mold 100 including a pair of slide pieces 101, 101 and a cross-sectional view of the injection molding mold 100 illustrating an open state (state during demolding) of the pair of slide pieces 101, 101. FIG. 12 is a cross-sectional view of the conventional injection molding mold 100 including the pair of slide pieces 101, 101 and a cross-sectional view of the injection molding mold 100 illustrating a closed state (state during mold clamping) of the pair of slide pieces 101, 101.

As illustrated in FIG. 11, in the conventional injection molding mold 100, the pair of slide pieces 101, 101 constituting the mold are slidably movable in an up-down direction. The slide piece 101 positioned upward among the pair of slide pieces 101, 101 is constantly biased to the upper side by a spring 102. An elastic force from the spring 102 pushes the slide piece 101 against a slide piece stopper 103, thus holding the slide piece 101 at an open position by the elastic force from the spring 102. Additionally, the slide piece 101 positioned downward among the pair of slide pieces 101, 101 is pushed against the slide piece stopper 103 by own weight, thus holding the slide piece 101 at an open position (position abutting on the slide piece stopper 103).

As illustrated in FIG. 11, with the injection molding mold 100 in the demolded state, after a movable side mold 104 to which the slide pieces 101 are mounted moves toward a fixed side mold 105 and operation pins 106 (angular pins) of the fixed side mold 105 engage with inclined holes 107 on the slide pieces 101, when the movable side mold 104 additionally moves toward the fixed side mold 105, the operation pins 106 push inner surfaces of the inclined holes 107 on the slide pieces 101, the upper slide piece 101 pushes the spring 102 to compress the spring 102 and slidably moves toward a closed position, and the lower slide piece 101 slidably moves toward the closed position against own weight.

As illustrated in FIG. 12, with the injection molding mold 100 in the mold clamping state where the pair of slide pieces 101, 101 are butted together (closed), an inclined surface 108 at an upper end or a lower end of the pair of slide pieces 101, 101 is pushed in a close direction with the inclined surface 110 of the fixed side mold 105, and the closed state of the pair of slide pieces 101, 101 during the mold clamping is held. Afterwards, in the injection molding mold 100, a molten resin is injected from a gate (outside the drawing) into cavities 111, which are formed on butt surface sides of the pair of slide pieces 101, 101, thus shaping a molded product like a transfer of the shape of the cavity 111.

Afterwards, in the injection molding mold 100, when the molded product in the cavity 111 is cooled down to a temperature at which the molded product can be extracted, the movable side mold 104 is moved in a direction away from the fixed side mold 105, from the state during the mold clamping in FIG. 12 to a state during the demolding in FIG. 11. In this respect, since the upper slide piece 101 is biased upward (toward the open direction) by the spring 102, the inner surface of the inclined hole 107 slides while being pushed against the operation pin 106 and moves upward. When the operation pin 106 exits from the inclined hole 107, the upper slide piece 101 is held at the open position illustrated in FIG. 11 by the elastic force from the spring 102. Additionally, when the lower slide piece 101 slips down along the operation pin 106 due to own weight and the operation pin 106 exits from the inclined hole 107, the lower slide piece 101 abuts on the slide piece stopper 103 and stops, thus being held by the slide piece stopper 103 at the open position illustrated in FIG. 11.

Patent Document 1: JP-A-2002-187170 (See especially FIG. 7 and descriptions of paragraphs 0002 to 0006.)

With the conventional injection molding mold 100 illustrated in FIG. 11 and FIG. 12, excessively strong biasing force from the spring 102 to constantly upwardly bias the upper slide piece 101 possibly results in a failure of smoothly pushing down the slide piece 101 with the operation pin 106 when the operation pin 106 is pushed into the inclined hole 107 on the slide piece 101.

To avoid such failure, the conventional injection molding mold 100 is designed so as to generate the minimum biasing force by which the spring 102, which constantly upwardly biases the upper slide piece 101, ensures holding the slide piece 101 at the open position.

However, the repeated use of the thus designed conventional injection molding mold 100 causes a new problem that the biasing force from the spring 102 to bias the upper slide piece 101 lowers and therefore the spring 102 cannot hold the upper slide piece 101 at the open position. When such problem occurs in the conventional injection molding mold 100, the distal end of the operation pin 106 is not inserted into the inclined hole 107 on the upper slide piece 101 but collides with the upper slide piece 101, possibly causing a problem of damage in the operation pin 106 or damage in the upper slide piece 101.

Therefore, an object of the present invention is to provide a slide piece driving mechanism that ensures reliably holding a slide piece at an open position even when the slide piece is repeatedly used.

SUMMARY OF THE INVENTION

A slide piece driving mechanism 1, 50 according to the present invention includes a slide piece 2 and an operation pin 32. The slide piece 2 is mounted to be movable up and down on a surface of a first object 4 on a side opposed to a second object 3. The first object 4 is one of two objects that repeat relative approach and separation. The second object 3 is the other object among the two objects. The operation pin 32 is mounted to a surface of the second object 3 on a side opposed to the first object 4. The operation pin 32 is configured to be removed from and inserted into an inclined hole 33 on the slide piece 2. When the first object 4 approaches the second object 3, the operation pin 32 relatively moves in a direction inserted into the inclined hole 33 and the slide piece 2 moves down from an upper position. When the first object 4 is away from the second object 3, the operation pin 32 relatively moves in a direction removed from the inclined hole 33 and the slide piece 2 moves up from a lower position upward.

Additionally, with the slide piece driving mechanism 1, 50 according to the present invention, (1). The first object 4 includes a side surface guiding portion 22. The side surface guiding portion 22 guides a side surface 21 of the slide piece 2 to be slidably movable.

(2). When the side surface guiding portion 22 guides the slide piece 2 to move the slide piece 2 to an upper end position, a part of a stopper 15, 51 is pushed into a stopper hole 36 by a biasing force from biasing element and the stopper 15, 51 prevents the slide piece 2 from falling from the upper end position due to own weight. The stopper 15, 51 is disposed at the side surface guiding portion 22 to be slidably movable. The stopper hole 36 is formed at the side surface 21 of the slide piece 2.

(3). When the operation pin 32 is inserted into the inclined hole 33, the operation pin 32 pushes stopper releasing element 35 disposed to be slidably movable at the slide piece 2 and the stopper releasing element 35 pushed by the operation pin 32 pushes out the stopper 15, 51 from the stopper hole 36 against the biasing force from the biasing element to allow the slide piece 2 to fall from the upper end position due to its own weight.

Effects of the Invention

With a slide piece driving mechanism according to the present invention, at an upper end position (open position) of an upper slide piece, a shaft portion of a stopper engages with a stopper hole of the upper slide piece to support own weight of the slide piece by the shaft portion of the stopper. Accordingly, even when the slide piece is repeatedly used, the slide piece can be reliably held at the upper end position (open position) by the shaft portion of the stopper. Accordingly, the slide piece driving mechanism according to the present invention does not cause a problem of a conventional example.

BRIEF DESCRIPTION OF THE DRAWINGS

FIG. 10 is a cross-sectional view illustrated taken along a line A6-A6 of FIG. 8.

FIG. 12 is a cross-sectional view of the conventional injection molding mold including the pair of slide pieces and a cross-sectional view of the injection molding mold illustrating a closed state (state during mold clamping) of the pair of slide pieces.

DESCRIPTION OF PREFERRED EMBODIMENTS

The following describes embodiments of the present invention in detail with reference to the drawings.

First Embodiment

Figure 1:
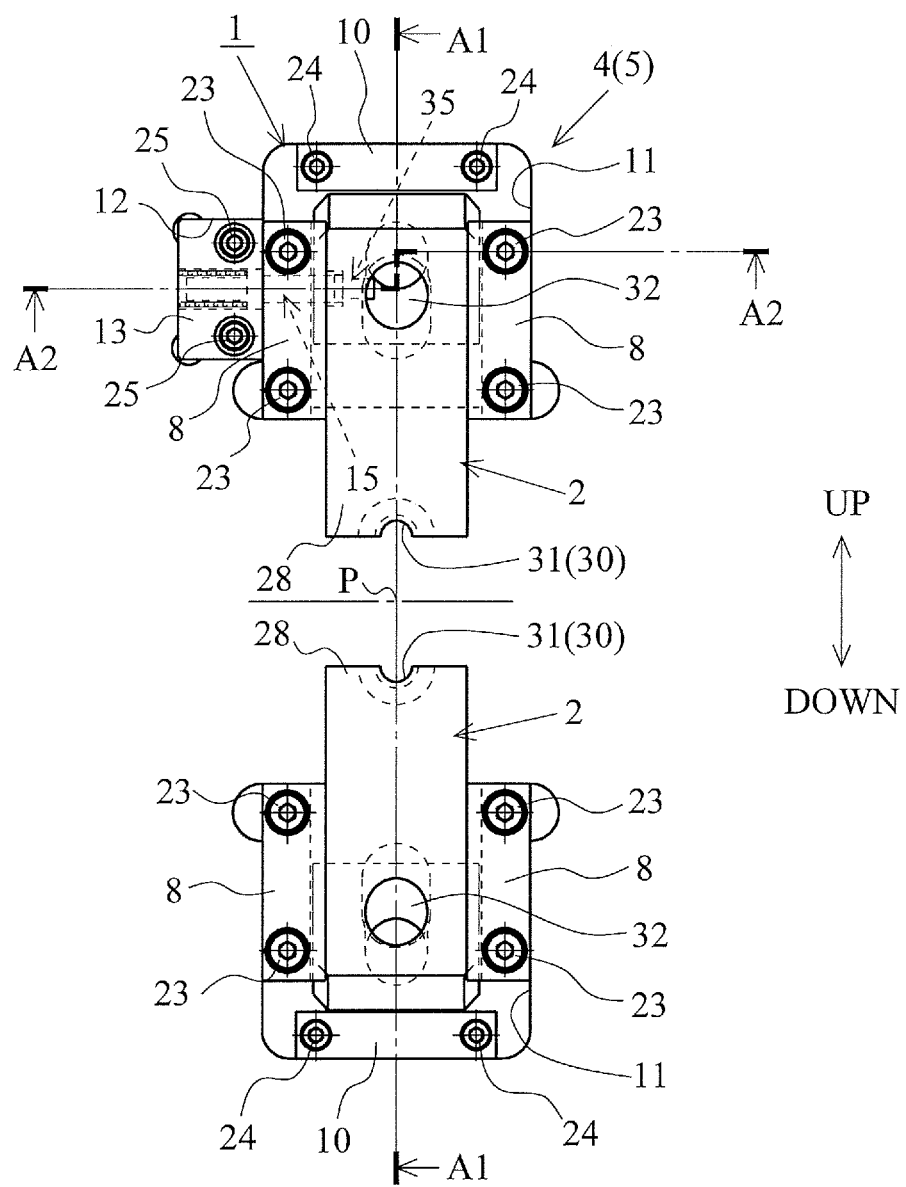
FIG. 1 is a drawing illustrating a slide piece driving mechanism according to a first embodiment of the present invention and a front view (drawing illustrated without a fixed side mold) of the slide piece driving mechanism illustrating an open state of slide pieces.
Figure 2:
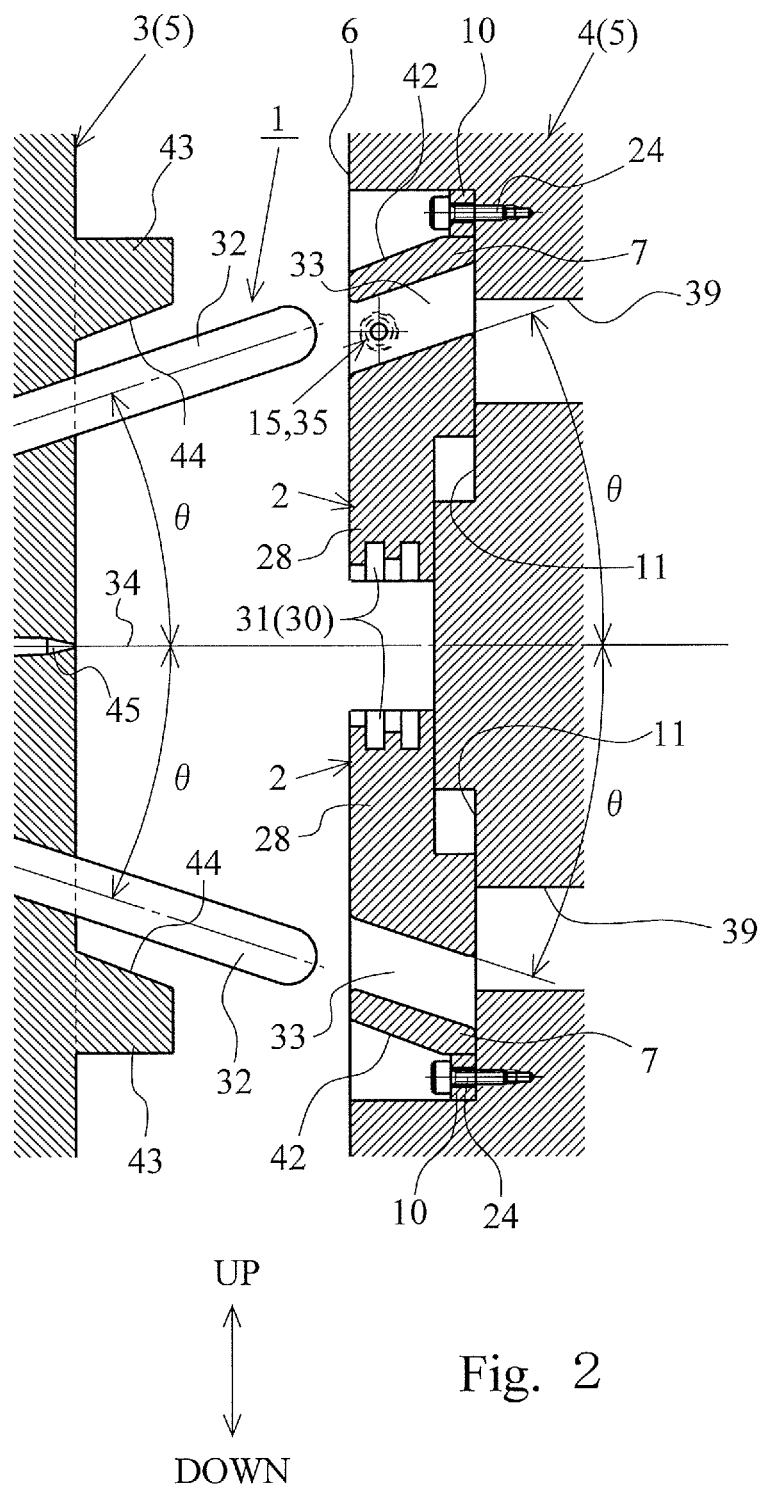
FIG. 2 is a cross-sectional view illustrating the fixed side mold and a movable side mold taken along a line A1-A1 of FIG. 1.
Figure 3:
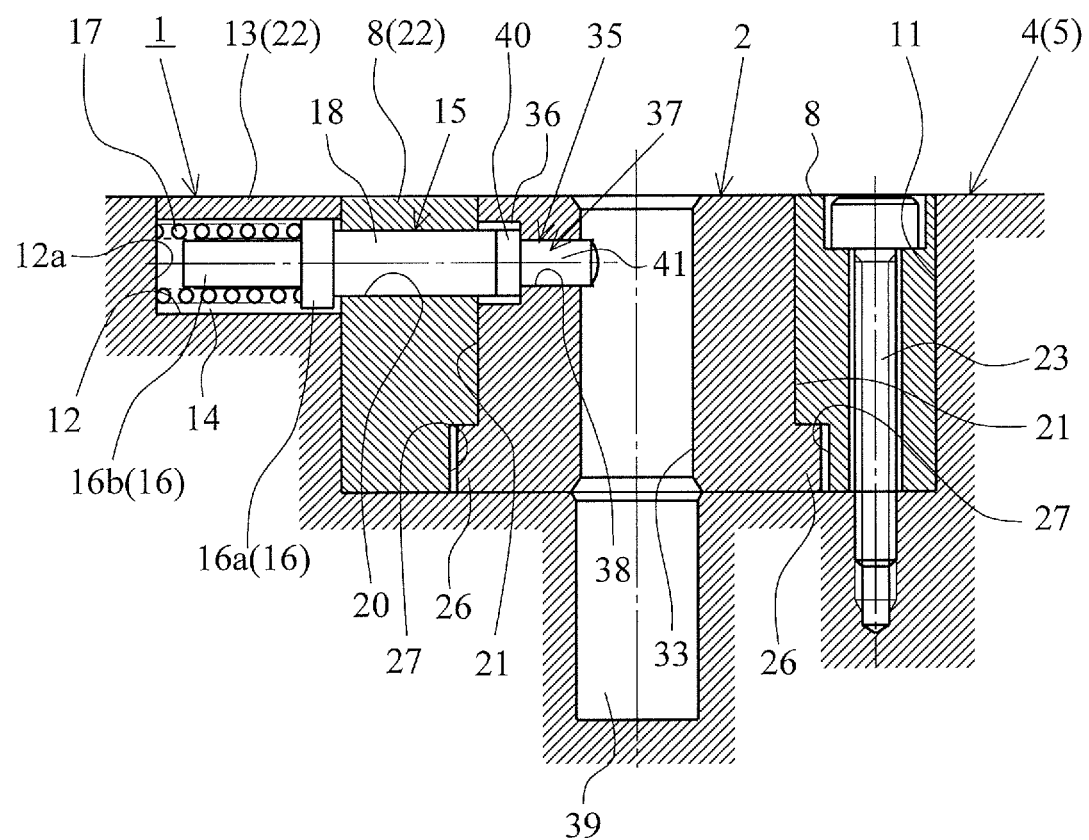
FIG. 3 is a cross-sectional view illustrating the movable side mold taken along a line A2-A2 of FIG. 1.
Figure 4:
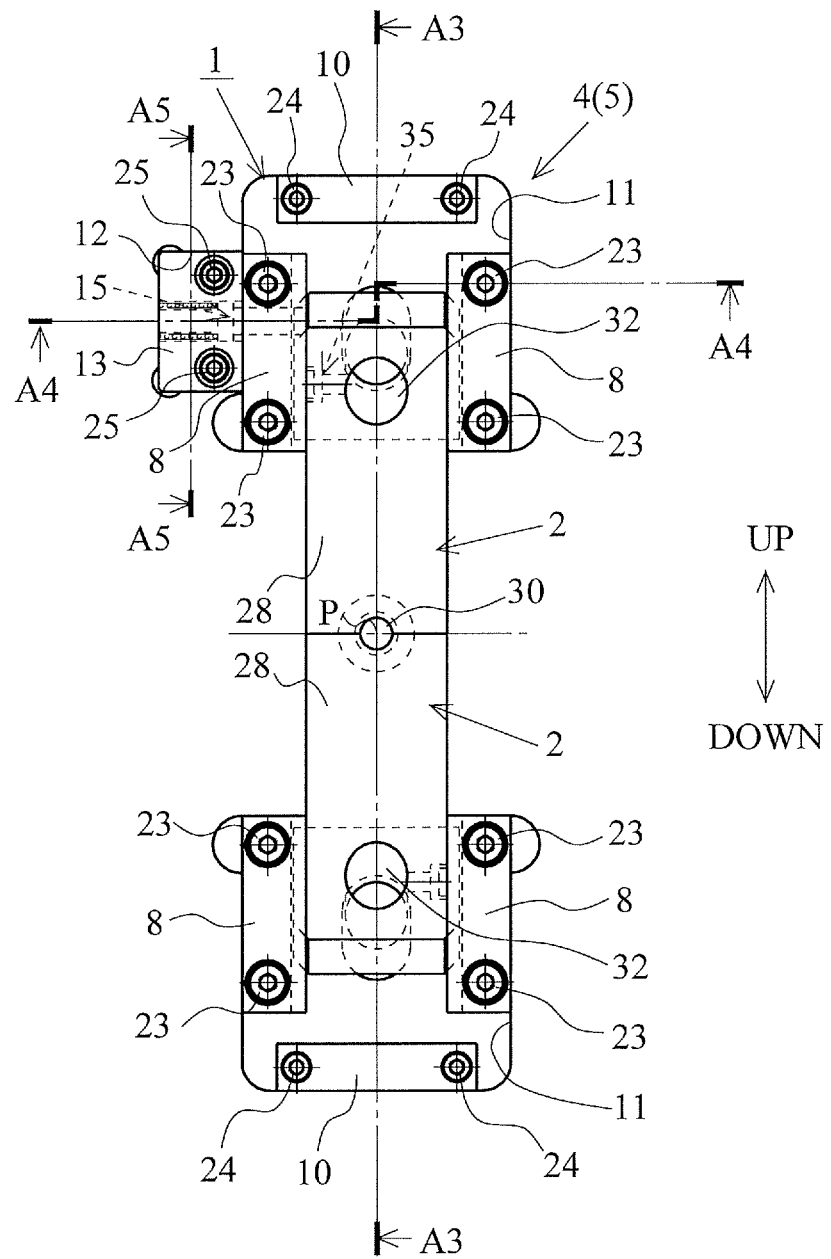
FIG. 4 is a drawing illustrating the slide piece driving mechanism according to the embodiment and a front view (drawing illustrated without the fixed side mold) of the slide piece driving mechanism illustrating a closed state of the slide pieces.
Figure 5:
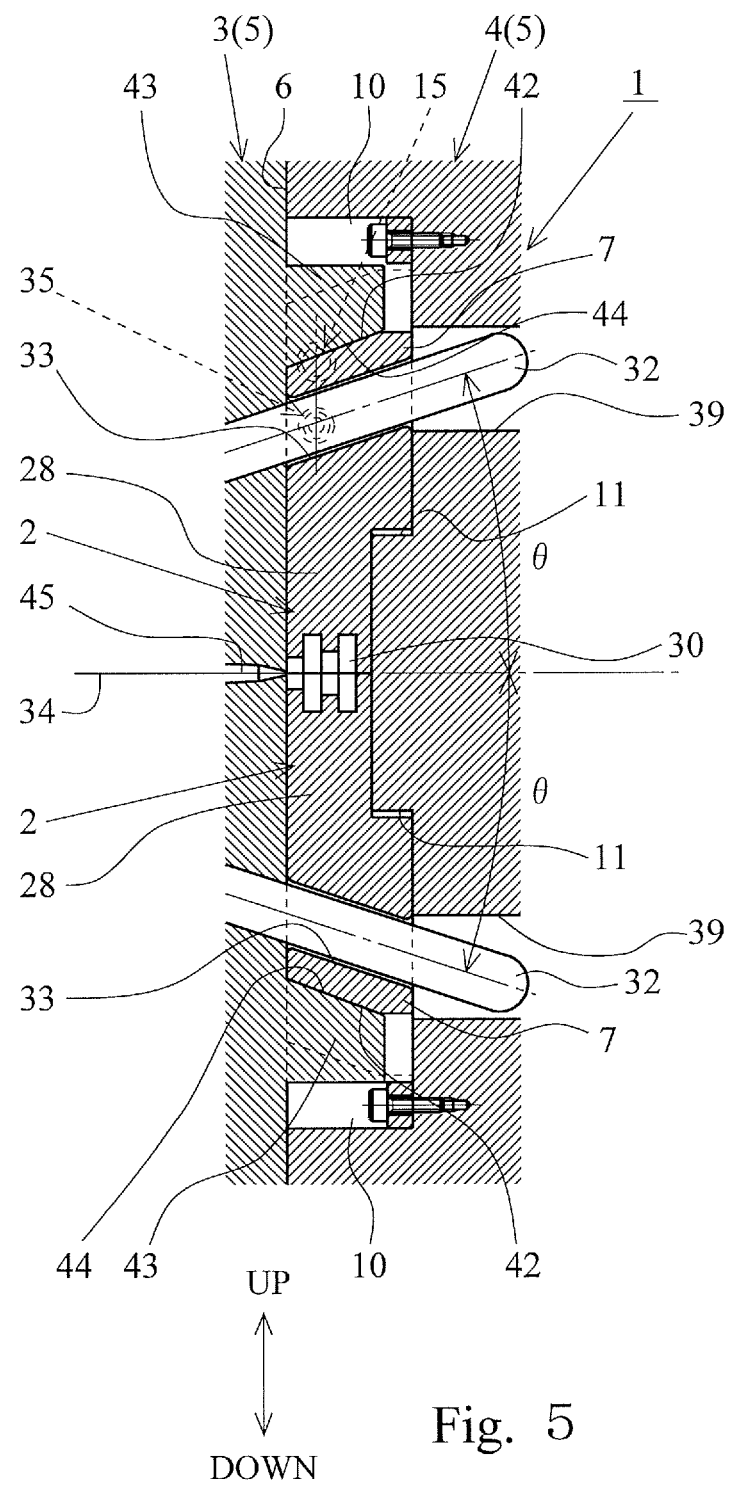
FIG. 5 is a cross-sectional view illustrating the fixed side mold and the movable side mold taken along a line A3-A3 of FIG. 4.
Figure 6:
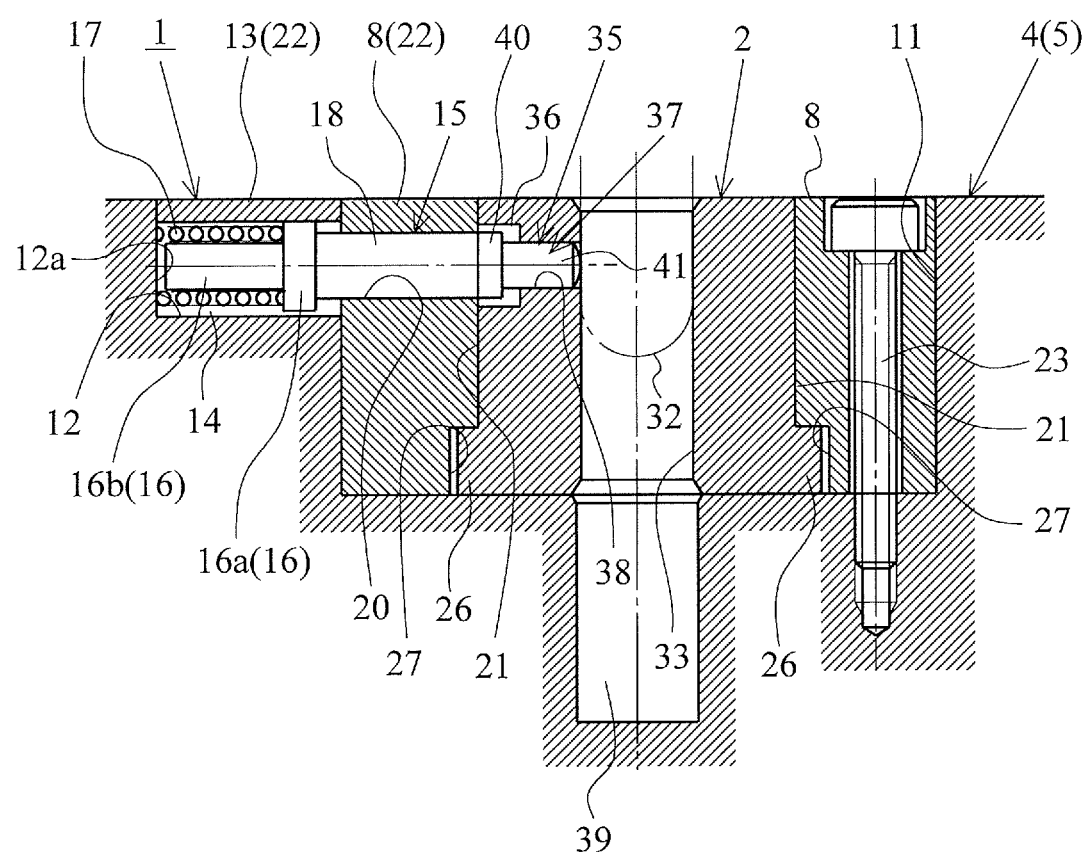
FIG. 6 is a cross-sectional view illustrating the movable side mold taken along a line A4-A4 of FIG. 4.
Figure 7:
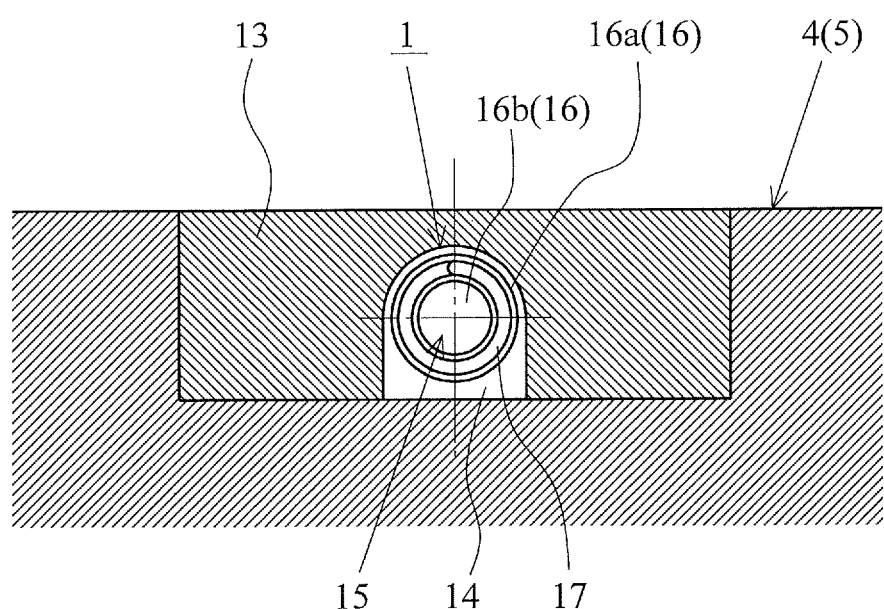
FIG. 7 is a cross-sectional view illustrating the movable side mold taken along a line A5-A5 of FIG. 4.

FIG. 1 to FIG. 7 are drawings illustrating a slide piece driving mechanism 1 according to the embodiment. FIG. 1 is a front view (drawing illustrated without a fixed side mold 3) of the slide piece driving mechanism 1 illustrating an open state of slide pieces 2. FIG. 2 is a cross-sectional view illustrating the fixed side mold 3 and a movable side mold 4 taken along a line A1-A1 of FIG. 1. FIG. 3 is a cross-sectional view illustrating the movable side mold 4 taken along a line A2-A2 of FIG. 1. FIG. 4 is a front view (drawing illustrated without the fixed side mold 3) of the slide piece driving mechanism 1 illustrating a closed state of the slide pieces 2. FIG. 5 is a cross-sectional view illustrating the fixed side mold 3 and the movable side mold 4 taken along a line A3-A3 of FIG. 4. FIG. 6 is a cross-sectional view illustrating the movable side mold 4 taken along a line A4-A4 of FIG. 4. FIG. 7 is a cross-sectional view illustrating the movable side mold 4 taken along a line A5-A5 of FIG. 4.

As illustrated in these drawings, an injection molding mold 5 includes the fixed side mold 3 (second object) and the movable side mold 4 (first object). For injection molding of a molded product including an undercut portion, the pair of slide pieces 2, 2 are mounted to the movable side mold 4 on a mold mating surface 6 (surface opposed to the fixed side mold 3) side so as to ensure an up-down movement of the pair of slide pieces 2, 2.

At the movable side mold 4, base portions 7 of the slide pieces 2, a pair of slide piece holding portions 8, 8, and slide piece housing recessed portions 11 to house slide piece stoppers 10 are formed by a pair to be a dyad symmetry with respect to a mold center P. A stopper housing recessed portion 12 is formed adjacent to the slide piece housing recessed portion 11 that houses the upper slide piece 2 among the pair of slide pieces 2, 2. A stopper holding portion 13 is mounted to this stopper housing recessed portion 12. The stopper holding portion 13 houses a base portion 16 of a stopper 15 and a spring 17 in an internal space. The slide piece holding portion 8 adjacent to the stopper holding portion 13 forms a shaft hole 20 that houses a shaft portion 18 of the stopper 15 to be slidable. The stopper holding portion 13 and the slide piece holding portion 8 adjacent to this stopper holding portion 13 constitute a side surface guiding portion 22 that guides a side surface 21 of the slide piece 2 to be slidably movable. The pair of slide piece holding portions 8, 8 and the slide piece stoppers 10 are fixed to bottom surfaces in the slide piece housing recessed portions 11 with bolts 23, 24. The stopper holding portion 13 is fixed to a bottom surface of the stopper housing recessed portion 12 with a bolt 25. The stopper holding portion 13 and the slide piece holding portion 8 may be integrally molded to be the side surface guiding portion 22.

In FIG. 1 and FIG. 4, the slide piece 2 is configured to move up and down by being guided and running along the respective slide piece holding portion 8, 8, which are located on both right and left sides of the slide piece 2. That is, in the slide piece 2, slide protrusions 26, 26, which are formed on the lower end sides of both right and left side surfaces 21, 21 so as to project out, are engaged with guide grooves 27 on the slide piece holding portions 8. The slide piece 2 can move up and down along the guide grooves 27 with an uplift from the bottom surface of the slide piece housing recessed portion 11 reduced.

At the slide piece 2, a cavity formation recessed site 31 to form a cavity 30 is formed at a distal end of an arm 28. With the pair of slide pieces 2, 2 in the closed state (mold clamping state) in FIG. 4 and FIG. 5, the distal ends of the respective arms 28, 28 are butted together, thus forming the cavity 30 with the pair of cavity formation recessed sites 31, 31. This cavity 30 is, for example, divided into two, the cavity 30 on the upper slide piece 2 and the cavity 30 on the lower slide piece 2, for injection molding of a gear including an undercut portion.

The slide piece 2 has an inclined hole 33 that engages with an operation pin 32 (angular pin) mounted to the fixed side mold 3. This inclined hole 33 has an angle (θ) formed with a mold center axis 34 identical to that of the operation pin 32 formed with the mold center axis 34 and is formed so as to be away from the mold center axis 34 as away from the mold mating surface 6 along the mold center axis 34 (see FIG. 2 and FIG. 5). When the operation pins 32 are inserted into the inclined holes 33, the pair of slide pieces 2, 2 are moved from the open position illustrated in FIG. 1 and FIG. 2 to the closed position (position where the distal ends of the pair of slide pieces 2, 2 are butted together) illustrated in FIG. 4 and FIG. 5. When the operation pins 32 are relatively moved in a direction exiting from the inclined holes 33 at the closed position illustrated in FIG. 4 and FIG. 5, the pair of slide pieces 2, 2 are moved from the closed position illustrated in FIG. 4 and FIG. 5 to the open position illustrated in FIG. 1 and FIG. 2. Here, the upper slide piece 2 among the pair of slide pieces 2, 2 is held with the stopper 15 at the open position in FIG. 1 and FIG. 2 (see FIG. 3). Additionally, the lower slide piece 2 among the pair of slide pieces 2, 2 is pushed against the slide piece stopper 10 by its own weight to be held at the open position in FIG. 1 and FIG. 2.

Next, the following describes details of the stopper 15 and stopper releasing element 35. As illustrated in FIG. 3, FIG. 6, and FIG. 7, the stopper 15 includes the base portion 16 housed in an internal space 14 of the stopper holding portion 13 and the shaft portion 18 inserted into the shaft hole 20 of the slide piece holding portion 8. The base portion 16 of the stopper 15 has a flange part 16a, which is formed at a boundary position with the shaft portion 18, and a spring supporting part 16b, which has a diameter smaller than that of this flange part 16a. The coiled spring 17 is fitted to the outer peripheral side of the spring supporting part 16b. The flange part 16a has one end side that supports the other end of the coiled spring 17, which is supported to a side surface 12a of the stopper housing recessed portion 12. The flange part 16a is formed to have a diameter larger than those of the shaft portion 18 and the shaft hole 20 and configured to slidably move into the internal space 14 of the stopper holding portion 13. Such stopper 15 is constantly biased with the spring 17 in a direction that the distal end side of the shaft portion 18 is pushed out from the shaft hole 20 of the slide piece holding portion 8 into a stopper hole 36 of the slide piece 2. Then, with the stopper 15, the distal end of the shaft portion 18 abuts on a stopper releasing pin 37 of the stopper releasing element 35 by the biasing force from the spring 17. Here, as illustrated in FIG. 3, the stopper hole 36 of the slide piece 2 engaged with the distal end of the shaft portion 18 of the stopper 15 is formed so as to match (so as to be opposed to) the shaft hole 20 of the slide piece holding portion 8 when the slide piece 2 moves to the upper end position (open position). When the distal end side of the shaft portion 18 engages with the stopper hole 36 of the slide piece 2, the stopper 15 supports the weight of the slide piece 2 by the shaft portion 18. Thus, the slide piece 2 is held at the upper end position (open position) and the slide piece 2 can be prevented from falling from the upper end position (open position) due to its own weight.

As illustrated in FIG. 3 and FIG. 6, the stopper releasing element 35 includes a stopper releasing pin guide hole 38 and the stopper releasing pin 37. The stopper releasing pin guide hole 38 is formed at the slide piece 2 so as to communicate between the stopper hole 36 and the inclined hole 33. The stopper releasing pin 37 is engaged such that a head portion 40 is housed in the stopper hole 36 to be slidably movable and a rod portion 41 is slidably movable to the stopper releasing pin guide hole 38. In a state where the upper slide piece 2 is at the open position (upper end position) and the shaft portion 18 of the stopper 15 is engaged with the stopper hole 36 (see FIG. 3), in the stopper releasing pin 37, the head portion 40 is pushed against the bottom surface of the stopper hole 36 by being pushed with the distal end of the shaft portion 18 of the stopper 15 and the distal end side of the rod portion 41 projects into the inclined hole 33. The head portion 40 in the stopper releasing pin 37 is formed to have a diameter smaller than that of the stopper hole 36 and larger than that of the stopper releasing pin guide hole 38.

With the stopper releasing element 35, when the movable side mold 4 is moved from the demolding position illustrated in FIG. 2 toward the mold clamping position illustrated in FIG. 5 and the operation pins 32 of the fixed side mold 3 are inserted into the inclined holes 33 on the slide pieces 2, the distal end of the rod portion 41 of the stopper releasing pin 37 abuts on the distal end of the operation pin 32 and the distal end side of the rod portion 41 of the stopper releasing pin 37 is pushed into the stopper releasing pin guide hole 38 from the inclined hole 33 by the operation pin 32 against the biasing force from the spring 17, and further the head portion 40 pushes out the shaft portion 18 of the stopper 15 from the stopper hole 36 to release the engagement between the stopper 15 and the stopper hole 36. Consequently, the slide piece 2 can fall along the operation pin 32 due to its own weight. In other words, the stopper releasing element 35 of the slide piece 2 is separate and discrete from the stopper 15 so as to be slidable with the slide piece 2 relative to the stopper 15 when the stopper 15 is disengaged from the stopper hole 36, and also so as to be slidable relative to a body of the slide piece 2 when pushed by the operation pin 32. Here, the distal end of the operation pin 32 and the distal end of the rod portion 41 of the stopper releasing pin 37 are rounded into a hemispherical shape. Consequently, the distal end of the rod portion 41 contacts the distal end of the operation pin 32 at a point, and thus the stopper releasing pin 37 is smoothly pushed into the stopper releasing pin guide hole 38. The distal end of the operation pin 32 and the distal end of the rod portion 41 of the stopper releasing pin 37 are not limited to be formed into the hemispherical shapes. As long as the stopper releasing pin 37 can be smoothly pushed into the stopper releasing pin guide hole 38 with the operation pin 32, the distal ends may have any shape and may be formed into, for example, a curved surface other than a spherical surface. The movable side mold 4 has a release hole 39 to avoid a collision with the operation pin 32.

With the stopper 15 and the stopper releasing element 35, the axial center of the stopper 15 matches the axial center of the stopper releasing pin 37 and the biasing direction of the spring 17 is a direction perpendicular to the inclined hole 33 at the upper end position (open position) of the upper slide piece 2. Additionally, in the slide piece 2, the stopper hole 36 and the stopper releasing pin guide hole 38 are formed perpendicular to the inclined hole 33.

With the fixed side mold 3 in the state during the mold clamping where the pair of slide pieces 2, 2 are butted together (closed), an inclined surface 42 formed on the upper end of the upper slide piece 2 is pressed in the close direction with an inclined surface 44 of an upper pressing block 43, and the inclined surface 42 formed on the lower end of the lower slide piece 2 is pressed in the close direction with the inclined surface 44 of the lower pressing block 43. Consequently, in the injection molding mold 5 during the mold clamping, the closed state of the pair of slide pieces 2, 2 is reliably held. Then, in the injection molding mold 5 during this mold clamping, the molten resin is injected from a gate 45 of the fixed side mold 3 into the cavity 30 formed on the pair of slide pieces 2, 2 on the butt surface side, thus shaping a molded product like a transfer of the cavity shape.

In the injection molding mold 5, when the molded product in the cavity 30 is cooled down to a temperature at which the molded product can be extracted, the movable side mold 4 is moved in a direction away from the fixed side mold 3, from the state during the mold clamping in FIG. 5 to a state during the demolding in FIG. 2. In this respect, the upper slide piece 2 is moved from the lower end position (closed position) to the upper end position (open position) with the operation pin 32. The lower slide piece 2 is moved from the upper end position (closed position) to the lower end position (open position) with the operation pin 32. Then, the upper slide piece 2 is held at the upper end position (open position) by the above-described shaft portion 18 of the stopper 15. The lower slide piece 2 is supported at the lower end position (open position) by the above-described slide piece stopper 10. Afterwards, the molded product is separated from the movable side mold 4 side.

With the slide piece driving mechanism 1 according to the above-described embodiments, the shaft portion 18 of the stopper 15 engages with the stopper hole 36 of the upper slide piece 2 at the upper end position (open position) of the upper slide piece 2 to support own weight of the slide piece 2 by the shaft portion 18 of the stopper 15; therefore, even when the slide piece 2 is repeatedly used, the slide piece 2 can be reliably held at the upper end position (open position) by the shaft portion 18 of the stopper 15. Accordingly, the slide piece driving mechanism 1 according to the embodiment does not cause the problem of the conventional example (the example that the distal end of the operation pin 106 collides with the upper slide piece 101 and this results in damage of the operation pin 106 or damage of the upper slide piece 101) caused by a failure of the insertion of the distal end of the operation pin 32 into the inclined hole 33 on the upper slide piece 2.

Second Embodiment

Figure 8:
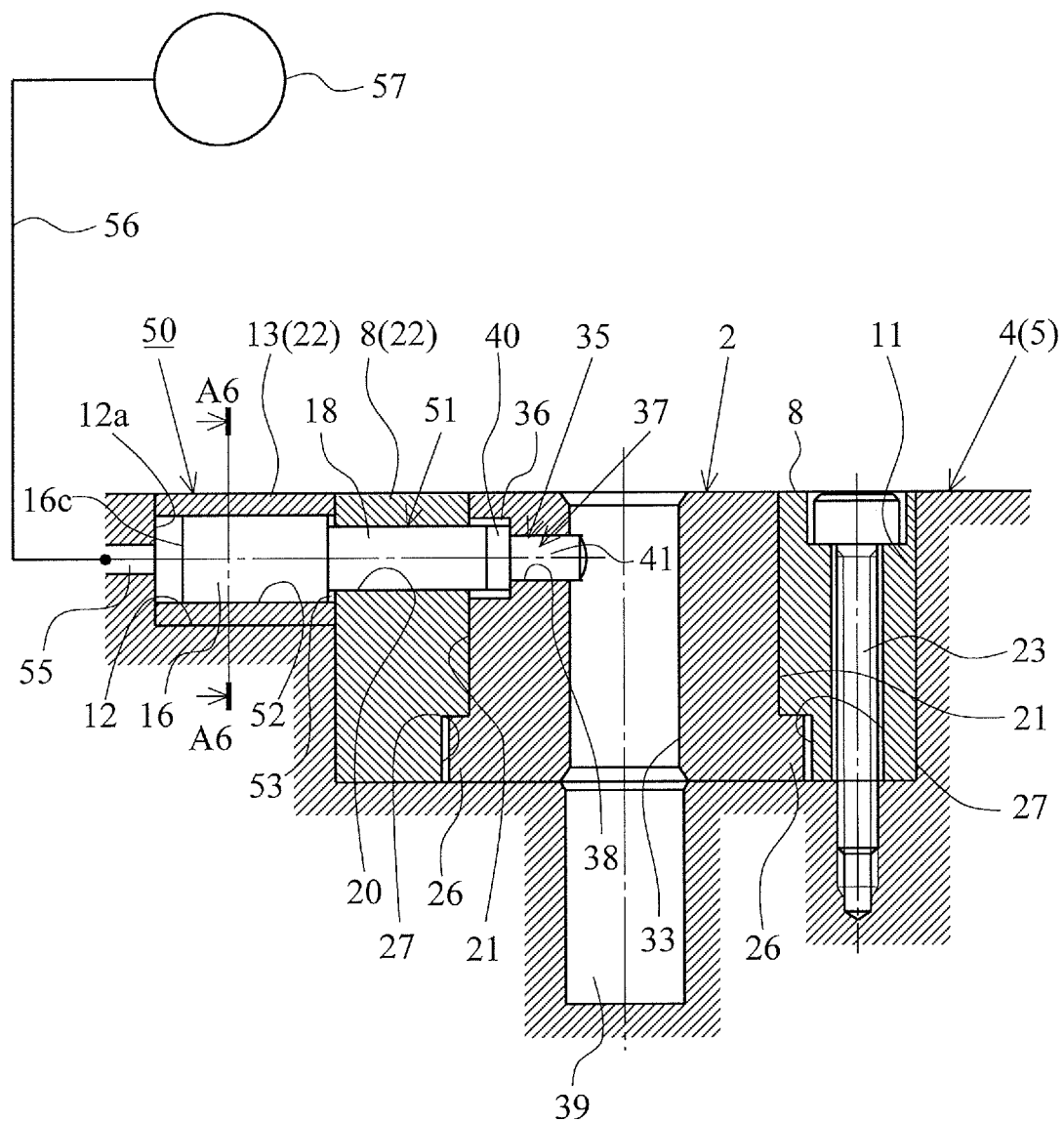
FIG. 8 is an explanatory drawing of a stopper and stopper releasing element constituting the slide piece driving mechanism according to a second embodiment of the present invention and a drawing (drawing corresponding to FIG. 3) illustrating operating states of the stopper and the stopper releasing element when the upper slide piece is at an upper end position (open position).
Figure 9:
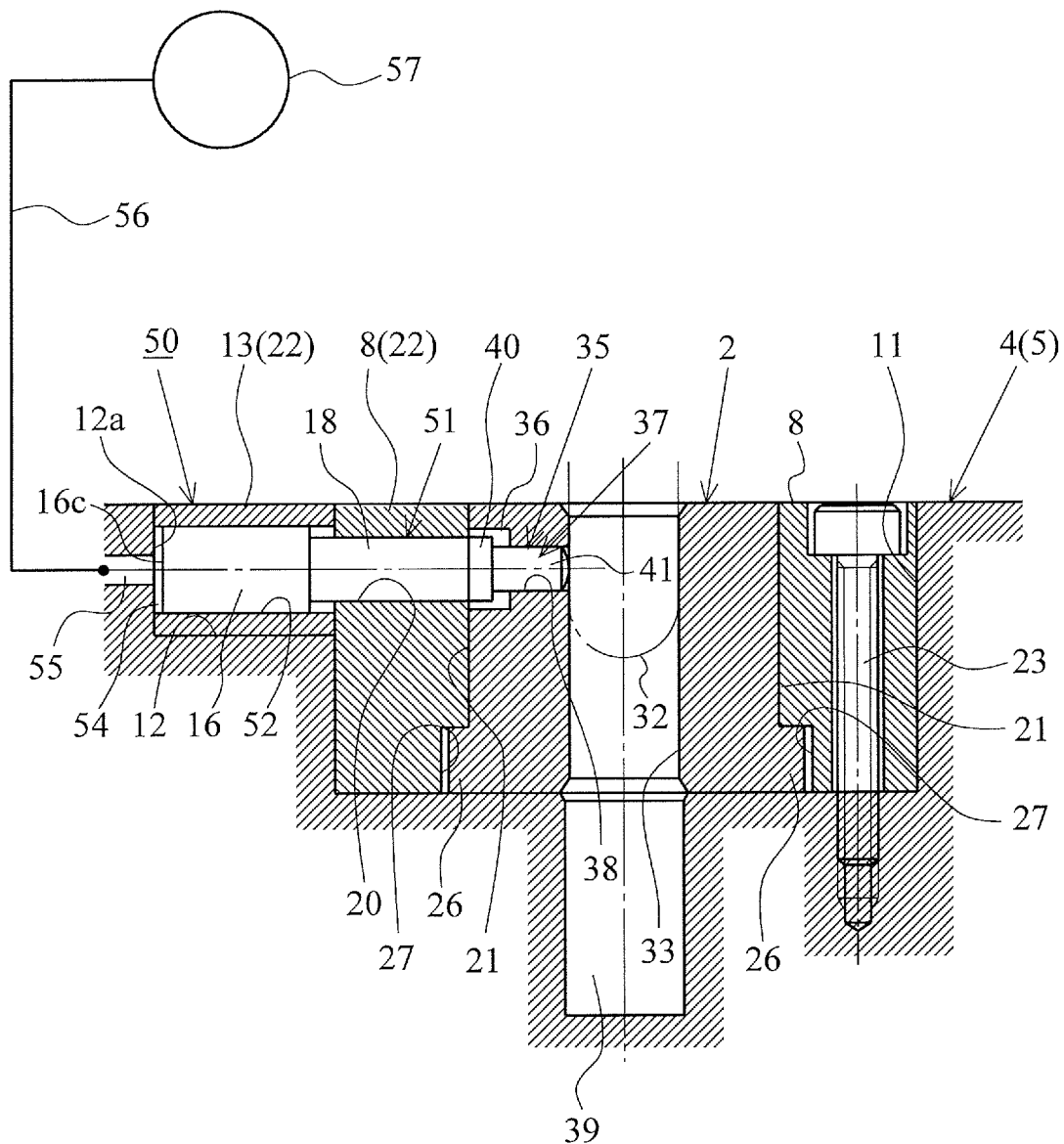
FIG. 9 is an explanatory drawing of the stopper and the stopper releasing element constituting the slide piece driving mechanism according to the second embodiment of the present invention and a drawing (drawing corresponding to FIG. 6) illustrating operating states of the stopper and the stopper releasing element when the upper slide piece is at a lower end position (closed position).
Figure 1:
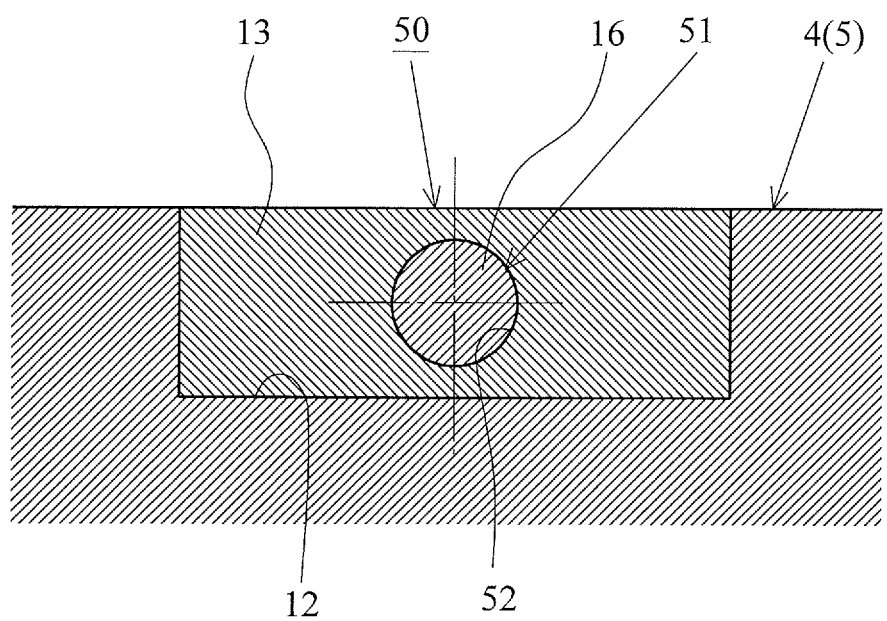
Figure 11:
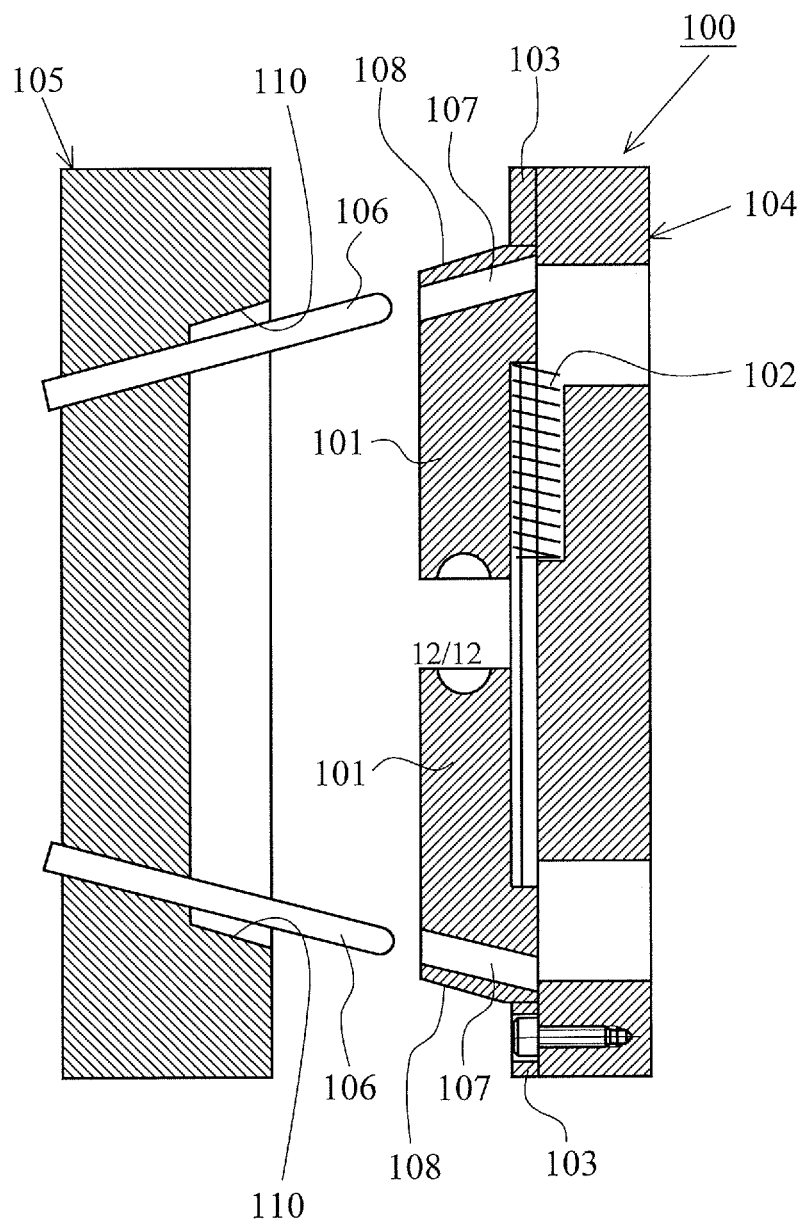
FIG. 11 is a cross-sectional view of a conventional injection molding mold including a pair of slide pieces and a cross-sectional view of the injection molding mold illustrating an open state (state during demolding) of the pair of slide pieces.
Figure 1:
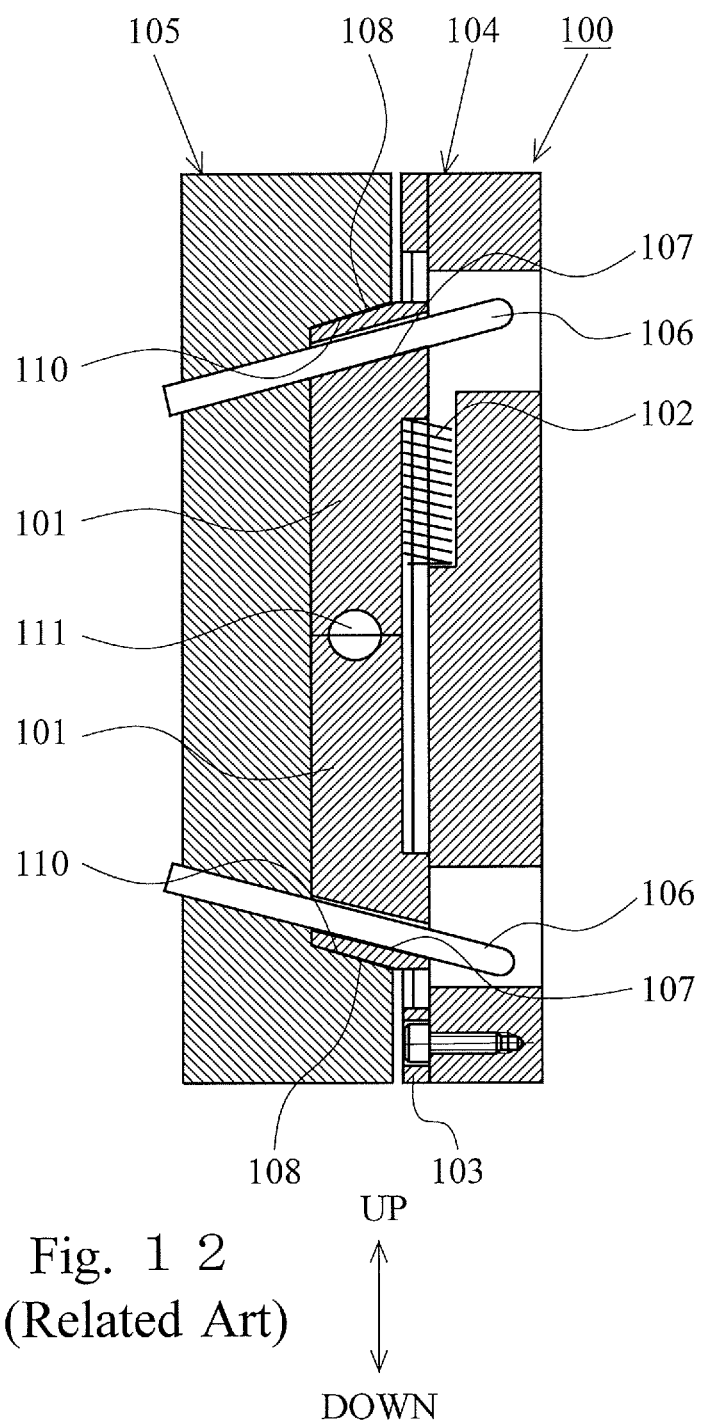

FIG. 8 to FIG. 10 are explanatory drawings of a stopper 51 and stopper releasing element 35 constituting a slide piece driving mechanism 50 according to the second embodiment of the present invention. FIG. 8 is a drawing illustrating an operating state of the stopper 51 and the stopper releasing element 35 when the upper slide piece 2 is at the upper end position (open position) and a drawing corresponding to FIG. 3. FIG. 9 is a drawing illustrating an operating state of the stopper 51 and the stopper releasing element 35 when the upper slide piece 2 is at the lower end position (closed position) and a drawing corresponding to FIG. 3. FIG. 10 is a cross-sectional view illustrated taken along a line A6-A6 of FIG. 8.

Except for the stopper 51 and a configuration related to the stopper 51, the slide piece driving mechanism 50 according to the embodiment has the other configuration similar to that of the slide piece driving mechanism 1 according to the first embodiment. Therefore, identical reference numerals are used for components corresponding to those of the slide piece driving mechanism 1 according to the first embodiment, and the following omits descriptions overlapped with those of the slide piece driving mechanism 1 according to the first embodiment.

As illustrated in FIG. 8 to FIG. 10, in the slide piece driving mechanism 50 according to the embodiment, the stopper 51 includes the base portion 16 and the shaft portion 18. The base portion 16 is housed in a guide hole 52 of the stopper holding portion 13 to be slidably movable. The shaft portion 18 is inserted into the shaft hole 20 of the slide piece holding portion 8 to be slidably movable. The base portion 16 of the stopper 51 has a diameter larger than those of the shaft portion 18 and the shaft hole 20 of the slide piece holding portion 8. In a state where the distal end of the shaft portion 18 maximally projects into the stopper hole 36 of the slide piece 2 (in the state of FIG. 8), the stopper 51 generates a clearance 53 with the slide piece 2. In a state where the distal end of the shaft portion 18 is pushed into the shaft hole 20 of the slide piece 2 (in the state of FIG. 9), a clearance 54 is generated between an end surface 16c and the side surface 12a of the stopper housing recessed portion 12.

An air introducing hole 55 is open at the side surface 12a of the stopper housing recessed portion 12. This air introducing hole 55 is formed on the movable side mold 4, is formed concentrically with the guide hole 52 of the stopper holding portion 13, and opens at the center of the guide hole 52 of the stopper holding portion 13. This air introducing hole 55 formed at the movable side mold 4 is coupled to a compressor 57 via an air flow passage 56 such that an air pressure supplied from the compressor 57 equally acts to the whole region of the end surface 16c of the base portion 16. A pressure adjusting valve and similar member are appropriately located at the air flow passage 56. Consequently, the air at a desired pressure is supplied into the guide hole 52 of the stopper holding portion 13. A ring-shaped seal member made of a synthetic resin material featuring a small sliding resistance may be mounted to the outer periphery of the base portion 16 of the stopper 51.

With the slide piece driving mechanism 50 according to the embodiment with the configuration, since the base portion 16 of the stopper 51 is constantly pressed toward the stopper releasing element 35 side by the air pressure supplied from the compressor 57, the air supplied from the compressor functions instead of the spring 17 of the stopper 15 according to the first embodiment. That is, in this embodiment, as illustrated in FIG. 8, with the stopper 51, when the upper slide piece 2 is at the upper end position (open position) (see FIG. 1 and FIG. 2), the base portion 16 is biased toward the right side direction in the drawing (the direction of the stopper releasing element 35) by the air pressure supplied from the compressor 57, and the distal end side of the shaft portion 18 is pushed into the stopper hole 36 of the slide piece 2. As illustrated in FIG. 9, with the stopper 51, in the case where the upper slide piece 2 is at the lower end position (closed position) (see FIG. 4 and FIG. 5), when the stopper releasing pin 37 as the stopper releasing element 35 is pushed and moved to the left side direction in the drawing by the operation pin 32, the stopper 51 pushed by the stopper releasing pin 37 compresses the air in the guide hole 52 of the stopper holding portion 13 and moves in the left side direction in the drawing, and the distal end side of the shaft portion 18 of the stopper 51 is pushed out from the inside of the stopper hole 36 of the slide piece 2 (the engagement between the stopper 51 and the stopper hole 36 is released).

The slide piece driving mechanism 50 according to the embodiment can obtain the effects similar to those of the slide piece driving mechanism 1 according to the first embodiment.

OTHER EMBODIMENTS

The slide piece driving mechanism according to the present invention is not limited to the use for the injection molding mold 5 as exemplified in the above-described respective embodiments and is also applicable to a mold for die cast.

The slide piece driving mechanism according to the present invention is not limited to the case where the slide pieces 2 are arranged by a pair and is also applicable to the case where the plurality of slide pieces 2, three or more, are arranged.

DESCRIPTION OF REFERENCE SIGNS 1, 50: Slide piece driving mechanism
2: Slide piece
3: Fixed side mold (second object)
4: Movable side mold (first object)
15, 51: Stopper
21: Side surface
22: Side surface guiding portion
32: Operation pin
33: Inclined hole
35: Stopper releasing element
36: Stopper hole

The invention claimed is:

1. A slide piece driving mechanism comprising: a slide piece mounted to be movable up and down on a surface of a first object on a side opposed to a second object, the first object and the second object being two objects that repeat relative approach and separation; and an operation pin mounted to a surface of the second object on a side opposed to the first object, the operation pin being configured to be removed from and inserted into an inclined hole on the slide piece, wherein, when the first object approaches the second object, the operation pin relatively moves in a direction inserted into the inclined hole and the slide piece moves down from an upper position, wherein, when the first object is away from the second object, the operation pin relatively moves in a direction removed from the inclined hole and the slide piece moves up from a lower position upward, wherein the first object includes a side surface guiding portion, the side surface guiding portion guiding a side surface of the slide piece to be slidably movable, wherein, when the side surface guiding portion guides the slide piece to move the slide piece to an upper end position, a part of a stopper is pushed into a stopper hole by a biasing force from a biasing element and the stopper prevents the slide piece from falling from the upper end position due to a weight of the slide piece, the stopper being disposed at the side surface guiding portion to be slidably movable, the stopper hole being formed at the side surface of the slide piece, wherein the slide piece includes a stopper releasing element separate and discrete from the stopper so as to be slidable with the slide piece relative to the stopper and so as to be slidable relative to a body of the slide piece, wherein the slide piece and the stopper releasing element are configured to be slidable relative to the stopper in a direction perpendicular to a longitudinal axis of the stopper, and wherein, when the operation pin is inserted into the inclined hole, the operation pin pushes the stopper releasing element such that the stopper releasing element pushes out the stopper from the stopper hole against the biasing force from the biasing element to allow the slide piece to fall with the stopper releasing element from the upper end position due to the weight of the slide piece.

2. The slide piece driving mechanism according to claim 1, wherein the biasing element is a spring, and the stopper is constantly biased with the spring toward the side surface of the slide piece, and when the slide piece reaches the upper end position, a distal end side of a shaft portion is pushed into the stopper hole of the slide piece by the biasing force from the spring to support the weight of the slide piece, the stopper releasing element includes a stopper releasing pin guide hole and a stopper releasing pin, the stopper releasing pin guide hole being formed in the slide piece to communicate between the stopper hole and the inclined hole, the stopper releasing pin being engaged such that a head portion of the stopper releasing pin is housed in the stopper hole to be slidably movable and a rod portion of the stopper releasing pin is slidably movable to the stopper releasing pin guide hole, and the stopper releasing pin is configured such that, in a state where the shaft portion of the stopper is engaged with the stopper hole, when the head portion of the stopper releasing pin is pushed by the shaft portion of the stopper, a distal end side of the rod portion of the stopper releasing pin projects into the inclined hole, and such that, when the operation pin is inserted into the inclined hole, the distal end of the rod portion of the stopper releasing pin abuts on a distal end of the operation pin, and the distal end side of the rod portion of the stopper releasing pin is pushed into the stopper releasing pin guide hole from the inclined hole by the operation pin against the biasing force from the spring, and the head portion of the stopper releasing pin pushes out the shaft portion of the stopper from the stopper hole to release engagement between the shaft portion of the stopper and the stopper hole.

3. The slide piece driving mechanism according to claim 1, wherein the biasing element is a compressor, and the stopper is constantly biased with an air pressure from the compressor toward the side surface of the slide piece, and when the slide piece reaches the upper end position, a distal end side of a shaft portion is pushed into the stopper hole of the slide piece by the air pressure to support the weight of the slide piece, the stopper releasing element includes a stopper releasing pin guide hole and a stopper releasing pin, the stopper releasing pin guide hole being formed in the slide piece to communicate between the stopper hole and the inclined hole, the stopper releasing pin being engaged such that a head portion of the stopper releasing pin is housed in the stopper hole to be slidably movable and a rod portion of the stopper releasing pin is slidably movable to the stopper releasing pin guide hole, and the stopper releasing pin is configured such that, in a state where the shaft portion of the stopper is engaged with the stopper hole, when the head portion of the stopper releasing pin is pushed by the shaft portion of the stopper, a distal end side of the rod portion of the stopper releasing pin projects into the inclined hole, and such that, when the operation pin is inserted into the inclined hole, the distal end of the rod portion of the stopper releasing pin abuts on a distal end of the operation pin, and the distal end side of the rod portion of the stopper releasing pin is pushed into the stopper releasing pin guide hole from the inclined hole by the operation pin against the air pressure, and the head portion pushes out the shaft portion of the stopper from the stopper hole to release the engagement between the shaft portion of the stopper and the stopper hole.

4. The slide piece driving mechanism according to claim 2, wherein the stopper hole and the stopper releasing pin guide hole are formed perpendicular to the inclined hole.

5. The slide piece driving mechanism according to claim 2, wherein each of the distal end of the operation pin and the distal end of the rod portion of the stopper releasing pin has a hemispherical shape.

6. The slide piece driving mechanism according to claim 1, wherein the first object is a movable side mold of an injection molding mold, and the second object is a fixed side mold of the injection molding mold.

7. The slide piece driving mechanism according to claim 4, wherein each of the distal end of the operation pin and the distal end of the rod portion of the stopper releasing pin has a hemispherical shape.

8. The slide piece driving mechanism according to claim 4, wherein the first object is a movable side mold of an injection molding mold, and the second object is a fixed side mold of the injection molding mold.

9. The slide piece driving mechanism according to claim 5, wherein the first object is a movable side mold of an injection molding mold, and the second object is a fixed side mold of the injection molding mold.

* * * * *